United States Patent
Lindblad et al.

(10) Patent No.: US 11,716,363 B2
(45) Date of Patent: Aug. 1, 2023

(54) MESSAGING RESOURCE FUNCTION

(71) Applicant: Telefonaktiebolaget LM Ericsson (publ), Stockholm (SE)

(72) Inventors: Ingemar Lindblad, Hägersten (SE); Staffan Persson, Kista (SE); Bengt Wretman, Västra Frölunda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/760,409

(22) PCT Filed: Nov. 2, 2017

(86) PCT No.: PCT/SE2017/051089
§ 371 (c)(1),
(2) Date: Apr. 29, 2020

(87) PCT Pub. No.: WO2019/088889
PCT Pub. Date: May 9, 2019

(65) Prior Publication Data
US 2020/0259873 A1    Aug. 13, 2020

(51) Int. Cl.
*H04L 65/1104* (2022.01)
*H04L 65/1016* (2022.01)
(Continued)

(52) U.S. Cl.
CPC ...... *H04L 65/1104* (2022.05); *H04L 65/1016* (2013.01); *H04L 65/1063* (2013.01); *H04L 65/1069* (2013.01); *H04L 65/4015* (2013.01)

(58) Field of Classification Search
None
See application file for complete search history.

(56) References Cited

U.S. PATENT DOCUMENTS 9,455,927 B1 * 9/2016 Nayak .................. H04L 47/522
9,602,556 B1 * 3/2017 Cham ................ H04L 65/1036
(Continued)

FOREIGN PATENT DOCUMENTS

CN    1853399 A    10/2006
CN    101087269 A    12/2007
(Continued)

OTHER PUBLICATIONS

International Search Report and Written Opinion issued in International Application No. PCT/SE2017/051089 dated Aug. 6, 2018 (10 pages).
(Continued)

*Primary Examiner* — Dhairya A Patel
(74) *Attorney, Agent, or Firm* — Rothwell, Figg, Ernst & Manbeck, P.C.

(57) ABSTRACT

A method of exchanging content between a User Equipment, UE, and an Application Server, AS, of an IP Multimedia Subsystem, IMS, or between the UE and a peer UE. The method comprises establishing a Session Initiation Protocol, SIP, session between said messaging resource function and the AS; establishing a Message Session Relay Protocol, MSRP, session between the UE and a messaging resource function of the IMS; and exchanging content between the first mentioned UE and the messaging resource function in messages sent over the established MSRP session.

8 Claims, 5 Drawing Sheets

(51) Int. Cl.
  *H04L 65/1063* (2022.01)
  *H04L 65/1069* (2022.01)
  *H04L 65/401* (2022.01)

(56) References Cited

U.S. PATENT DOCUMENTS

| | | | | |
|---|---|---|---|---|
| 10,771,510 | B2* | 9/2020 | Stille | H04L 65/4046 |
| 11,601,391 | B2* | 3/2023 | Agrawal | G06F 18/00 |
| 2007/0233682 | A1 | 10/2007 | Haruna et al. | |
| 2008/0043717 | A1* | 2/2008 | Bellora | H04L 65/4061 |
| | | | | 370/352 |
| 2009/0248810 | A1* | 10/2009 | Zhu | H04L 12/14 |
| | | | | 709/206 |
| 2010/0142411 | A1* | 6/2010 | Holm | H04L 65/1063 |
| | | | | 370/259 |
| 2010/0254370 | A1 | 10/2010 | Jana et al. | |
| 2012/0072503 | A1* | 3/2012 | Kowalewski | H04L 65/1083 |
| | | | | 709/229 |
| 2012/0131114 | A1* | 5/2012 | Lu | H04L 65/1104 |
| | | | | 709/206 |
| 2012/0275432 | A1* | 11/2012 | Lei | H04L 65/80 |
| | | | | 370/331 |
| 2013/0163590 | A1* | 6/2013 | Bouvet | H04L 65/80 |
| | | | | 370/352 |
| 2013/0238729 | A1* | 9/2013 | Holzman | H04L 12/1836 |
| | | | | 709/206 |
| 2014/0195607 | A1* | 7/2014 | Kowalewski | H04L 67/1063 |
| | | | | 709/204 |
| 2016/0165600 | A1* | 6/2016 | Choi | H04L 1/1671 |
| | | | | 370/336 |
| 2016/0352795 | A1* | 12/2016 | Badulescu | H04L 65/762 |
| 2017/0054764 | A1* | 2/2017 | Sharma | H04L 45/22 |
| 2017/0272474 | A1* | 9/2017 | Stille | H04L 65/4046 |
| 2017/0289349 | A1* | 10/2017 | Ou | H04M 3/567 |
| 2020/0259873 | A1* | 8/2020 | Lindblad | H04L 65/1016 |
| 2022/0141264 | A1* | 5/2022 | Prakash | H04L 65/1076 |
| | | | | 370/260 |
| 2023/0037852 | A1* | 2/2023 | Islam | H04W 68/02 |

FOREIGN PATENT DOCUMENTS

| | | |
|---|---|---|
| CN | 101110790 A | 1/2008 |
| CN | 101652973 A | 2/2010 |
| EP | 2 096 822 A2 | 9/2009 |
| EP | 2 326 058 A1 | 5/2011 |
| WO | 2010/132820 A1 | 11/2010 |

OTHER PUBLICATIONS

3GPP TS 24.229 V13.5.1 (Mar. 2016), 3rd Generation Partnership Project; Technical Specification Group Core Network and Terminals; IP multimedia call control protocol based on Session Initiation Protocol (SIP) and Session Description Protocol (SDP); Stage 3, Mar. 2016 (920 pages).

Donovan, S., "The SIP INFO Method," Request for Comments (RFC) 2976, Network Working Group, Oct. 2000 (9 pages).

* cited by examiner

MESSAGING RESOURCE FUNCTION

CROSS REFERENCE TO RELATED APPLICATION(S)

This application is a 35 U.S.C. § 371 National Stage of International Patent Application No. PCT/SE2017/051089, filed Nov. 2, 2017, designating the United States.

TECHNICAL FIELD

The present invention relates to method and apparatus for exchanging content between a User Equipment (UE) and an Application Server, AS, of an IP Multimedia Subsystem, IMS. It makes use of a new network function referred to here as a Messaging Resource Function.

BACKGROUND

IP Multimedia services provide a dynamic combination of voice, video, messaging, data, etc. within the same session. By growing the number of basic applications and the media that it is possible to combine, the number of services offered to the end users will grow, and the inter-personal communication experience will be enriched. This will lead to a new generation of personalised, rich multimedia communication services.

IP Multimedia Subsystem (IMS) is the technology defined by the Third Generation Partnership Project (3GPP) to provide IP Multimedia services over mobile communication networks. IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

IMS services are enabled by so-called Application Servers (ASs). An AS may for example provide video conference calls to a group of users connected to the IMS via respective User Equipments (UEs), e.g. mobile phones, laptops etc.

An AS may also want to exchange messages between itself and UEs and other nodes in the IMS. For example, an AS may be used in a Chat Helpdesk, to match customers to agents. It may be desirable to send messages from the AS to the customer, or to receive messages from the customer at the AS. Currently, all IMS ASs that want to make use of the Message Session Relay Protocol (MSRP) must implement an MSRP stack and handle all the complexity that comes with anchoring media. This makes it more difficult to create and manage new IMS ASs with messaging support.

SUMMARY

According to a first aspect of the present invention there is provided a method of exchanging content between a User Equipment, UE, and an Application Server, AS, of an IP Multimedia Subsystem, IMS, or between the UE and a peer UE. The method comprises establishing a Session Initiation Protocol, SIP, session between a messaging resource function of the IMS and the AS, and establishing a Message Session Relay Protocol, MSRP, session between the UE and the messaging resource function. The method also comprises exchanging content between the first mentioned UE and the messaging resource function in messages sent over the established MSRP session.

Where content is exchanged between the first mentioned User Equipment, UE, and the Application Server, AS, the method may comprise exchanging said content between the messaging resource function and the AS over the established SIP session.

Exchanging content between the UE and the AS may comprise sending a SIP message comprising instructions from the AS to the messaging resource function over the established SIP session, and sending a message from the messaging resource function to the first mentioned UE over the established MSRP session according to the instructions.

Where content is exchanged between the UE and the peer UE, the method may comprise exchanging said content between the messaging resource function and the peer UE over a further MSRP session.

A SIP INVITE containing an MSRP session setup request may be sent from the UE to the AS to initiate said establishing steps. The MSRP session setup request can be contained within a Session Description Protocol, SDP, part of the SIP INVITE. Upon receipt of the SIP INVITE at the AS, the As may forward the SIP INVITE to the messaging resource function or the AS may construct a further SIP INVITE including the MSRP session setup request and send that further SIP INVITE to the messaging resource function.

The method may comprise receiving as content in a message or messages sent over one of said sessions, a target identity, and upon receipt of the content at the messaging resource function, the target identity can be used to fetch further content from some other entity. The further content is included in said message or messages and sent over a second of the sessions.

In a second aspect of the present invention there is provided a method of operating a messaging resource function within an IP Multimedia Subsystem, IMS, in order to facilitate the exchange of content between User Equipments, UEs, or between the UEs and one or more Application Servers, ASs. the method comprises establishing Session Initiation Protocol, SIP, sessions between the or each AS and the messaging resource function of the IMS, and establishing respective Message Session Relay Protocol, MSRP, sessions between the UEs and the messaging resource function. the method also comprises exchanging content between the UEs and the messaging resource function in messages sent over the respective established MSRP sessions.

Where content is exchanged between the UEs and the one or more ASs, the method may comprise receiving said content from the one or more ASs and/or sending said content to the one or more ASs over the or each established SIP session.

Exchanging content may comprise receiving from the or each AS a SIP message comprising instructions from the AS, and sending messages to the UEs over the respective established MSRP sessions according to the instructions.

Where content is exchanged between UEs, the method may comprise exchanging said content between the messaging resource function and other UEs over the other UEs respective established MSRP sessions.

A SIP INVITE from an AS containing an MSRP session setup request may be received to initiate said establishing steps. The MSRP session setup request may be contained within a Session Description Protocol, SDP, part of the SIP INVITE.

The method may comprise receiving as content in a message or messages sent over one of said sessions, a target identity, and upon receipt of the content, using the target identity to fetch further content from some other entity and including that further content in said message or messages sent over a second of the sessions.

According to a third aspect of the invention there is provided an apparatus for implementing a messaging resource function in an IP Multimedia Subsystem, IMS, to facilitate the exchange of content between User Equipments, UEs, or between the UEs and one or more Application Servers, ASs. The apparatus comprises a processor or processors configured to establish respective Session Initiation Protocol, SIP, sessions between the AS(s) and the messaging resource function of the IMS, and to establish respective Message Session Relay Protocol, MSRP, sessions between the UEs and the messaging resource function. The processor or processors are also configured to exchange content between the UEs and the messaging resource function in messages sent over the respective established MSRP sessions.

The apparatus may comprise a receiver configured to receive messages sent over the established SIP and MSRP sessions, and a transmitter configured to send messages over the established SIP and MSRP sessions.

Where the exchange of content between the UEs and the one or more ASs is facilitated, the receiver may be configured to receive said content from the one or more ASs, and/or the processor may be configured to effect the transmitter to send said content to the one or more ASs over the or each established SIP session.

The receiver may be configured to receive content from the one or more ASs and to receive, from the or each AS, a SIP message comprising instructions from the AS. The processor may be configured to effect the transmitter to send messages to the UEs over the respective established MSRP sessions according to the instructions.

The receiver may be configured to receive said content from other UEs, and/or the processors may be configured to effect the transmitter to send said content to other UEs over the other UEs' respective established MSRP sessions.

The receiver may be configured to receive SIP INVITEs containing an MSRP session setup request to initiate said establishing steps. The MSRP session setup request may be contained within a Session Description Protocol, SDP, part of the SIP INVITEs.

The receiver may be configured to receive as content in a message or messages sent over one of said sessions, a target identity, and the processor may be configured to, upon receipt of the content, use the target identity to fetch further content from some other entity and include that further content in said message or messages, and to effect the transmitter to send said message or messages over a second of the sessions.

The apparatus may comprise a memory for storing instructions which can be effected by the processor to establish the SIP and MSRP sessions, and to exchange content between the UEs and the messaging resource function.

DETAILED DESCRIPTION

Embodiments of the invention provide a new function in an IP Multimedia Subsystem (IMS) network referred to as a Messaging Resource Function (MsgRF). The MsgRF may be referred to as a "node" in the IMS although it may be implemented as a standalone node, colocated in a node with other functions, and/or implemented in a cloud configuration. The function implements a Session Initiation Protocol (SIP) interface which allows IMS Application Servers (ASs) to manage messaging in sessions or groups via a control protocol based on SIP (e.g. using SIP INFO). This is similar to how MSCML/MSML is used for the Media Resource Function, relying upon the negotiation of a session (also referred to as "establishing a session") using Session Description Protocol (SDP) via 3pcc (third party call control), sending chat messages, receiving chat messages (like "ivr" used by the MRF for audio/video), managing group sessions (like "conf" used by the MRF to manage conferences).

Figure 1:
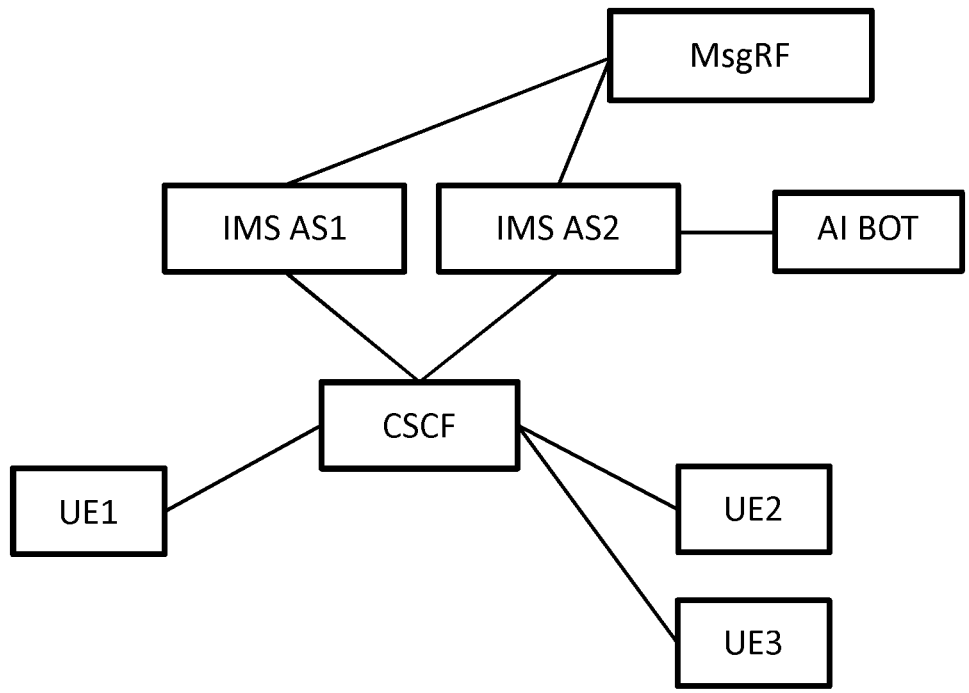
FIG. 1 is a schematic diagram of an IMS network with a MsgRF.

FIG. 1 illustrates an IMS network with three User Equipments (UE1, UE2 and UE3) connected to the IMS network via a Call Session Control Function (CSCF). The CSCF connects one or more of the UEs to two Application Servers (IMS AS1 and IMS AS2). UE1 may be receiving a service from IMS AS1 only and UE2 from IMS AS2 only, while UE3 may be receiving a service from both IMS AS1 and IMS AS2, for example. IMS AS2 is connected to an Artificial Intelligence bot (AI BOT). Both IMS AS1 and IMS AS2 are connected to a Messaging Resource Function (MsgRF). Connected, in this sense, is not intended to be limiting and only implies that the application servers (IMS AS1 and IMS AS2) communicate (e.g. with SIP messages) with the MsgRF. The application servers can provide messaging support to the UEs via the MsgRF. That is, AS1 and/or AS2 may leverage the MsgRF to facilitate messaging. The MsgRF may be configured to establish a MSRP session with a UE in response to receiving a SIP INVITE (related to that UE) from one of the application servers.

The MsgRF is configured to enable the UEs and application servers to exchange content over the MSRP sessions and SIP sessions. The SIP session between the MsgRF and an AS can be established by receiving at the MsgRF a SIP INVITE from the AS and sending a SIP response from the MsgRF to the AS. For example, the MsgRF may be configured to receive SIP messages (e.g. SIP INFO messages) comprising instructions from the application servers, and to send messages over MSRP sessions to one or more of the UEs, according to the instructions. The MsgRF may also be configured to fetch images or files to be included in any such MSRP message to one or more UEs. For example, the instructions from the AS may comprise a target identity (e.g. a web address, or file address), which allows the MsgRF to fetch content from some other entity (e.g. a local or remote sever), and include that content in a message over a MSRP session to one or more of the UEs.

In this sense, 'exchanging content' comprises both the simple relaying of information from a UE to one or more other UEs or from a UE to an AS via the MsgRF (and vice versa), as well as more complex functions performed by the MsgRF. For example, as described above, the MsgRF may fetch, ad and/or modify the content that is exchanged.

Figure 2:
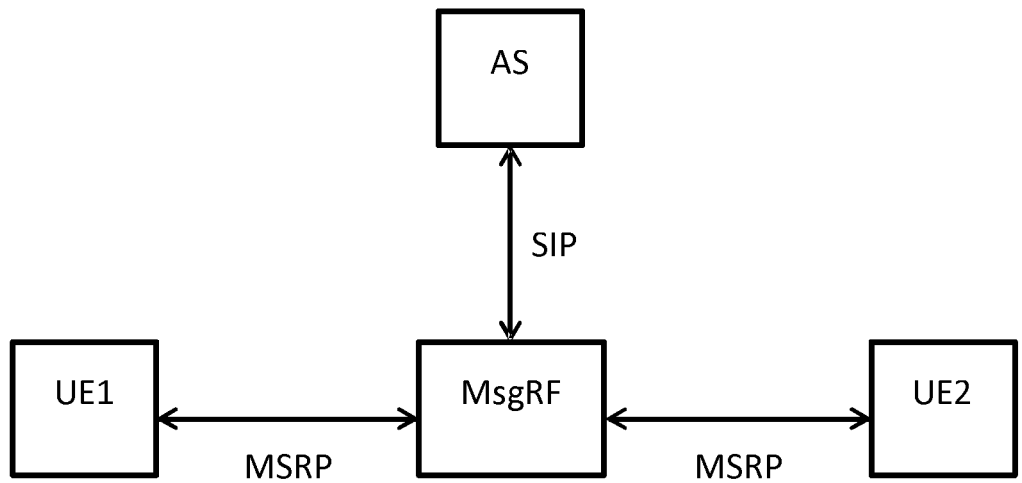
FIG. 2 is schematic diagram of a network with two UEs anchored to a MsgRF.

FIG. 2 is a schematic diagram of two UEs (UE1 and UE2), which may be UE1 and UE2 in FIG. 1, anchored to a MsgRF. The MsgRF has established an MSRP session over which UE1 and UE2 can send messages. The MsgRF relays messages between UE1 and UE2 and may insert or modify content within any such message. In particular, the MsgRF may add or modify content to a message between UE1 and UE2 according to instructions received from the AS. The MsgRF may receive SIP messages (e.g. SIP INFO messages) comprising instructions from the AS, and also send messages and events to the AS. For example, the MsgRF may send an event to the AS whenever UE1 or UE2 sends a message over the MSRP session. The event may be a SIP message comprising the content of the MSRP message sent from UE1 or UE2.

Figure 3:
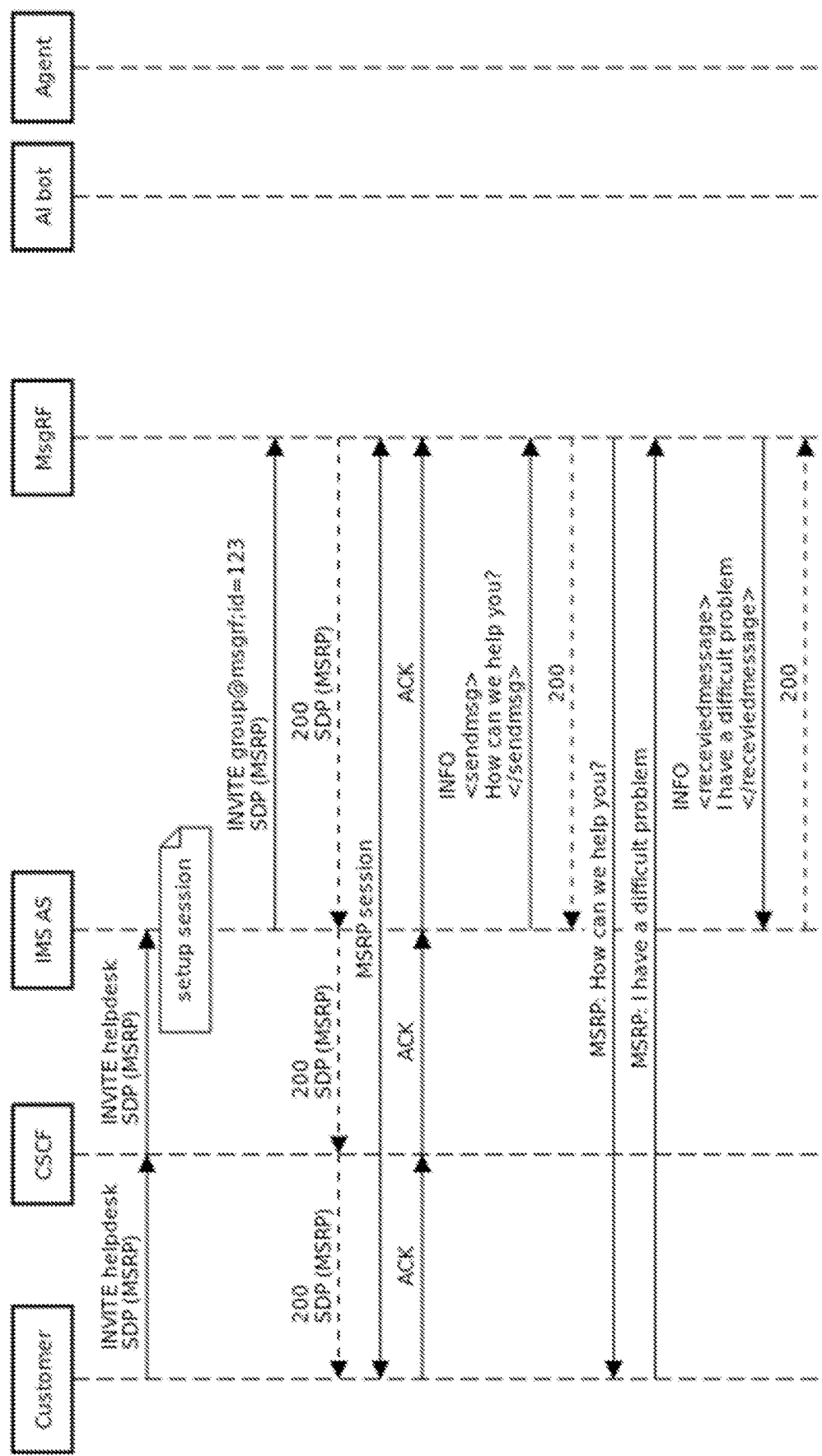
FIG. 3 is sequence diagram illustrating a method of exchanging content between an AS and a UE.
Figure 3:
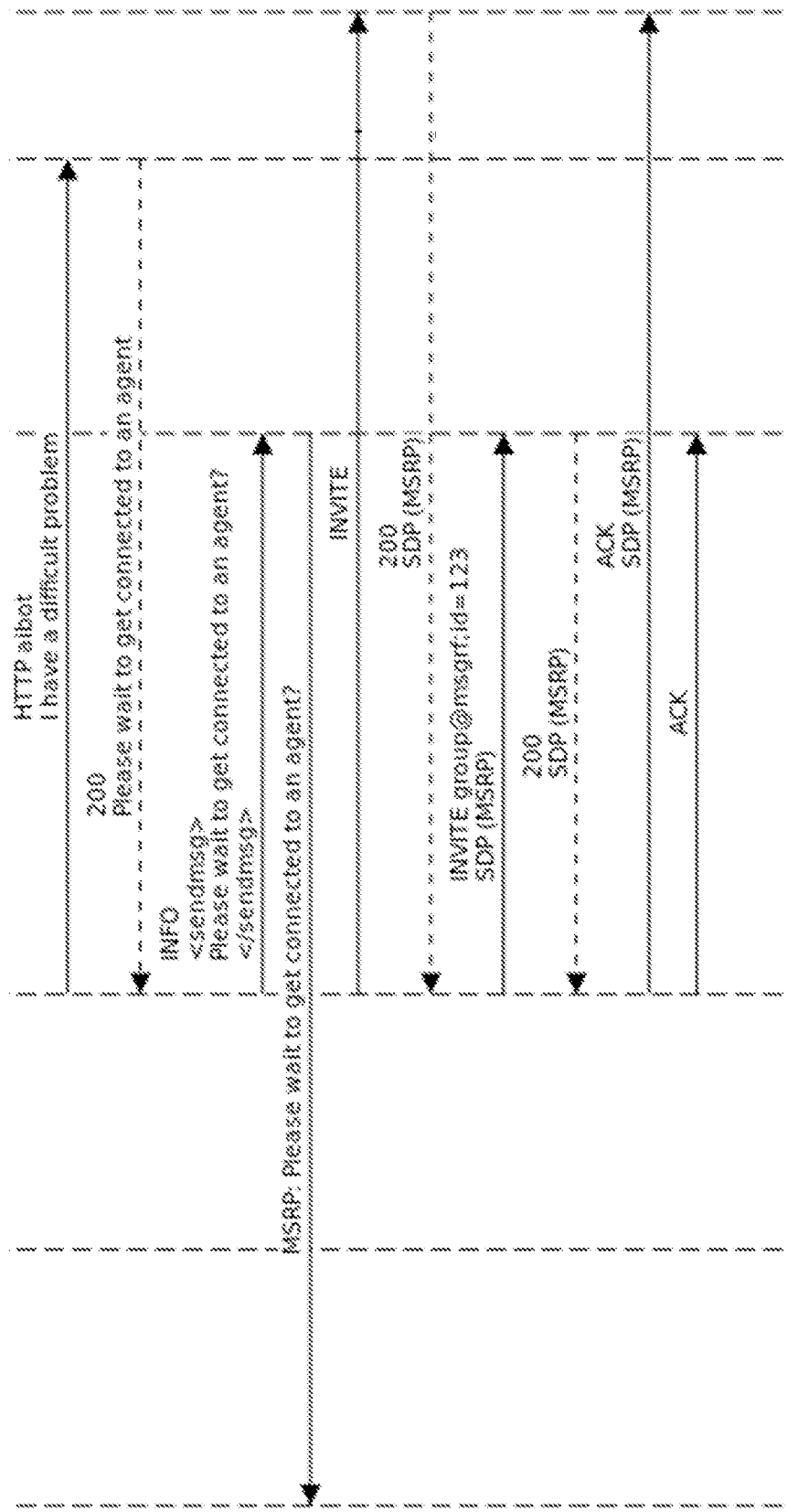

FIG. 3 is a sequence diagram of a method employed in a customer support (chat helpdesk) scenario. In a Chat Helpdesk, chat sessions are put into queue before the IMS AS (also referred to as "the AS") controlling the "hunting" algorithm has found a suitable agent. A chat session in the queue corresponds to a customer who is connected to the IMS via a UE. The customer (UE1) sends an SIP INVITE with a SDP to the AS via the CSCF in the IMS. The AS sets up a chat session with the customer (UE1).

Since the Chat Helpdesk wants to send messages to the customers in the queue it wants to set up an MSRP session between the MsgRF and the customer (UE1). The AS sends a SIP INVITE with the SDP to the MsgRF. The MsgRF receives the SIP INVITE from the AS and sends a SIP 200 response to the AS, which routes the response to the customer (UE1). Sending the response to the customer (UE1) establishes a MSRP session between the MsgRF and the customer (UE1). UE1 sends an ACK message to the MsgRF.

The AS then signals the MsgRF to send a message over the MSRP session, asking what the customer wants. That is, the AS sends a SIP INFO message comprising instructions to the MsgRF. The instructions inform the MsgRF to send a message comprising the text "How can we help?" to the customer (UE1). The MsgRF receives the SIP INFO message from the AS, and sends a message over the MSRP session to the customer (UE1) according to the instructions from the AS. The customer (UE1) answers by sending a message back to the MsgRF over the MSRP session. The message from the customer (UE1) comprises the text "I have a difficult problem". The MsgRF receives the message from the customer (UE1), and, in response to receiving the message, an event (e.g. a SIP INFO message) is sent from the MsgRF to the AS.

The AS relays the customer message (i.e. the text "I have a difficult problem") to an AI (Artificial Intelligence) bot using HTTP. The AI bot does not know the answer to the question, and informs the AS of this.

The AS sends a SIP INFO message to the MsgRF, containing instructions to send the text "Please wait to get connected to an agent" to the customer (UE1). The MsgRF receives the message from the AS, and sends the text in a message over the MSRP session to the customer (UE1), according to the instructions. The AS finds an agent (UE2) who might know the answer to the question and connects the agent (UE2) to the chat session. To connect the agent to the chat session, the AS sends a SIP INVITE to the agent (UE2).

In response, the agent sends a SIP 200 response with a SDP to the AS. The AS receives the response and sends a SIP INVITE with the SDP to the MsgRF. The MsgRF sends a SIP 200 response to the AS in order to establish a MSRP session between the MsgRF and the agent (UE2). The agent (UE2) sees the history of the chat session with the AI bot and answers the question.

In the scenario described above the MsgRF enables the customer (UE1) and the AS to exchange content over the MSRP session and the SIP session by relaying messages. That is, the MsgRF 'translates' MSRP messages (i.e. messages received over the MSRP session) from the UE into SIP messages which can be sent from the MsgRF to the AS over the SIP session. The process also works in reverse, where SIP messages received from the AS are 'translated' and sent over the MSRP session to the customer (UE1).

More generally, embodiments provide a method of communication between an AS and one or more UEs, using a MsgRF. To establish a MSRP session between the MsgRF and a UE, the MsgRF receives an INVITE message from the AS originating from the UE. In response, the MsgRF sends a response, e.g. a SIP 200 response, to the UE via the AS. That is, the MsgRF sends the response to the AS, and the AS routes it to the UE. Sending the response from the MsgRF establishes a MSRP session between the MsgRF and the UE. The MsgRF and the UE can send messages directly between each other over the MSRP session.

A second UE may connect (also referred to as "anchor") to the MsgRF by sending an INVITE to the AS which in turn sends a SIP INVITE to the MsgRF. The MsgRF receives the SIP INVITE, originating from the second UE, from the AS. The MsgRF sends a response, e.g. a SIP 200 response, to the second UE via the AS. That is, the MsgRF sends the response to the AS, and the AS routes the response to the second UE. Sending the response from the MsgRF establishes a (second) MSRP session between the MsgRF and the second UE. The MsgRF and the second UE can send messages directly between each other over the (second) MSRP session. The MsgRF may receive SIP messages from the AS with instructions for sending messages to one or both of the first and second UEs. For example, if a third UE connects to the AS (e.g. a third participant who joins a chat group) the AS may send a message to the MsgRF with instructions to notify the first and second UEs of the third UE connected to the AS. The MsgRF receives the SIP message comprising the instructions from the AS and sends a message over the first and second MSRP sessions to the first and second UEs respectively. Similarly, if a specific UE in a group of UEs, connected to the AS via the MsgRF, leaves the group (e.g. by disconnecting from the network) the AS may send a message (e.g. a SIP INFO message) to the MsgRF comprising instructions to inform each UE remaining in the group that a UE has left the group.

Alternatively, the AS may renegotiate an MSRP session directly between a first UE and a second UE (for example between the customer and the agent), if anchoring is no longer needed. This may be preferable if network resources need to be conserved.

The AS may monitor the session by receiving events (e.g. SIP INFO messages) from the MsgRF when messages are sent or received by the UEs. For example, the first UE may send a message to the second UE over a MSRP session. The message is routed via the MsgRF. As the MsgRF receives the message it may send an event to the AS. The event may comprise the message sent between the UEs.

In one embodiment the MsgRF receives a message (e.g. a SIP INFO message) comprising instructions from the AS.

The message may specify a UE or a group of UEs to which the MsgRF is connected by respective MSRP sessions, and instructions to send a message to the specified UE or group of UEs. The message may further comprise content, e.g. text, images or files, to be included in the message to the UE or group of UEs. Alternatively, or in addition, the message may comprise instructions for fetching content to be included in the message to the UE or group of UEs, e.g. with the content to be fetched being identified by a URL.

For example, UE1, UE2, and UE3 may form a group of UEs. UE1, UE2 and UE3 are all connected to an AS (e.g. an application server which provides message conference services). At some point after the UEs have connected to the AS via the MsgRF, a fourth UE (UE4) wants to join the group. The AS receives a SIP INVITE with a SDP from UE4. The AS sends a new SIP INVITE with the SDP and a session identity (ID), related to the group of UEs, to the MsgRF. The MsgRF receives the SIP INVITE from the AS and establishes a MSRP session between the MsgRF and UE4 by sending a SIP response to the AS (which in turn sends a SIP response to UE4). At this stage, the MsgRF receives a message comprising instructions from the AS. The instructions inform the MsgRF to notify UE1, UE2 and UE3 (the original group members) of the arrival of UE4. The message may also contain an image, for example related to a user profile of UE4, which is to be sent with the notification. Alternatively, the instructions may inform the MsgRF to fetch such an image (e.g. from a server, or database). The MsgRF sends a message, comprising the notification and the image, to UE1, UE2 and UE3, according to the instructions from the AS. The UEs in the group may send MSRP messages (i.e. messages over an MSRP session) to each other via the MsgRF.

At some later time, UE1 may accidentally lose its connection to the IMS (e.g. by moving out of WiFi coverage). The AS determines that UE1 is no longer in the group of UEs. For example, the MsgRF may send a SIP INFO message to the AS informing the AS that UE1 is no longer anchored to the MsgRF. The AS instructs the MsgRF to notify UE2, UE3 and UE4 (i.e. the UEs remaining in the group) that UE1 has left the group. The MsgRF receives the message (e.g. a SIP INFO message) comprising the instructions and sends a MSRP message to the UEs remaining in the group, according to the instructions from the AS.

In one embodiment, the MsgRF may be used by the AS to send content generated at one UE to another UE or a group of UEs. The one UE sends the content, to the MsgRF in a message over a MSRP session. The MsgRF receives the message with the content. The MsgRF then sends a SIP message, e.g. a SIP INFO message, comprising the content to the AS. The AS determines that the content is to be shared with another UE or a group of UEs. The AS sends a SIP message, e.g. a SIP INFO message, to the MsgRF with instructions for sending the content to the other UE or the group of UEs. The MsgRF sends a message, comprising the content, to the other UE or the group of UEs according to the instructions.

Figure 4:
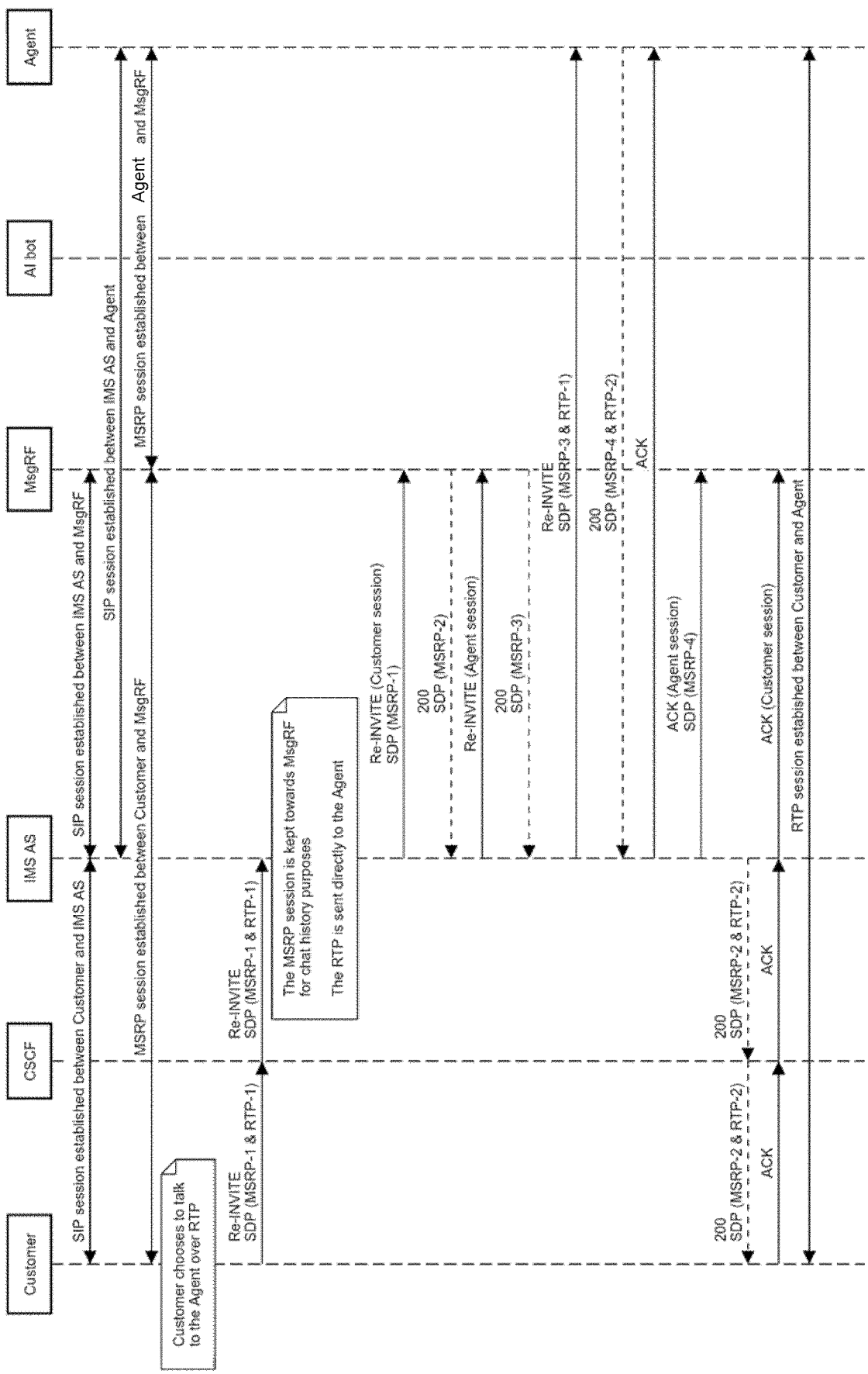
FIG. 4 is a sequence diagram illustrating an alternative method of exchanging content between an AS and a UE.

FIG. 4 shows a sequence diagram of an embodiment of a method for exchanging content between an IMS AS and a customer (UE1). SIP sessions are established between the customer and the AS, between the AS and the MsgRF, and between the AS and an agent (UE2). A MSRP session is established between the MsgRF and the customer, and between the MsgRF and the agent. The agent and the customer may now communicate with each other over the MSRP sessions via the MsgRF.

The customer chooses to also talk to the agent over Real Time Protocol (RTP), e.g. using real time audio or video. The customer sends a Re-INVITE with a new SDP including both a MSRP and RTP media description (MSRP-1 & RTP-1) to the AS (via the CSCF). The MSRP session is kept towards the MsgRF for chat purposes, while the RTP is sent to the agent. That is, the AS sends a Re-INVITE to the MsgRF with the MSRP-1 in the SDP context (media description). The MsgRF sends a SIP 200 response with MSRP-2 in the SDP to the AS. The AS sends a Re-INVITE to the MsgRF for the agent's MSRP session, and the MsgRF sends a SIP 200 response with MSRP-3 in the SDP to the AS. The AS sends a Re-INVITE to the agent with both the RTP and MSRP media descriptions, i.e. the SDP includes MSRP-3 and RTP-1. The agent sends a SIP 200 response with MSRP-4 and RTP-2 in the SDP to the AS. The AS sends an ACK with MSRP-4 to the MsgRF, to update the MSRP session between the MsgRF and the agent.

The AS has both the RTP and MSRP media descriptions from the agent and the MsgRF respectively, and sends a SIP 200 response to the customer (via the CSCF) with MSRP-2 and RTP-2 in the SDP. The customer sends an ACK to the AS which establishes the RTP session between the customer and the agent. The AS also sends an ACK to the MsgRF, which updates the MSRP session between the customer and the MsgRF.

Figure 5:
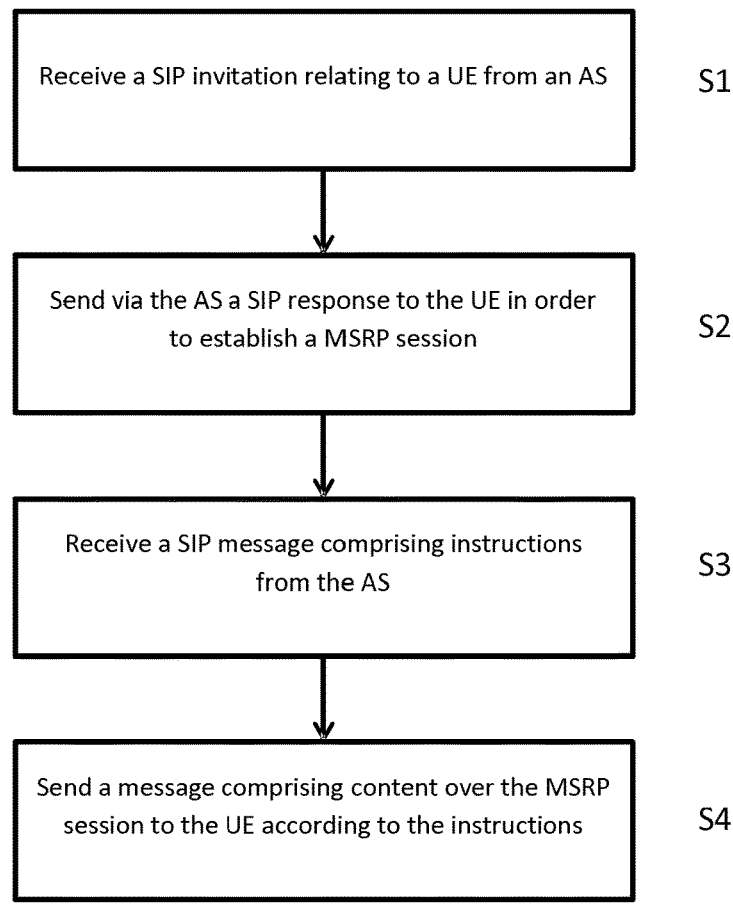
FIG. 5 is a flow chart illustrating a method according to an embodiment of the invention.

FIG. 5 is a flow diagram showing the steps of an embodiment of a method of exchanging content between a UE and an AS in an IMS. 1) Receive a SIP INVITE relating to a UE from an AS, S1. 2) Send via the AS a SIP response to the UE in order to establish a MSRP session, S2. 3) Receive a SIP message comprising instructions from the AS, S3. 4) Send a message comprising content over the MSRP session to the UE according to the instructions, S4.

In general, if the SIP INVITE contains multiple media descriptions (including MSRP) in the SDP, the AS may generate a new SIP INVITE with only the request for establishing a MSRP session (i.e. a SIP INVITE with only MSRP as a media description) and send this new SIP INVITE to the MsgRF.

Figure 6:
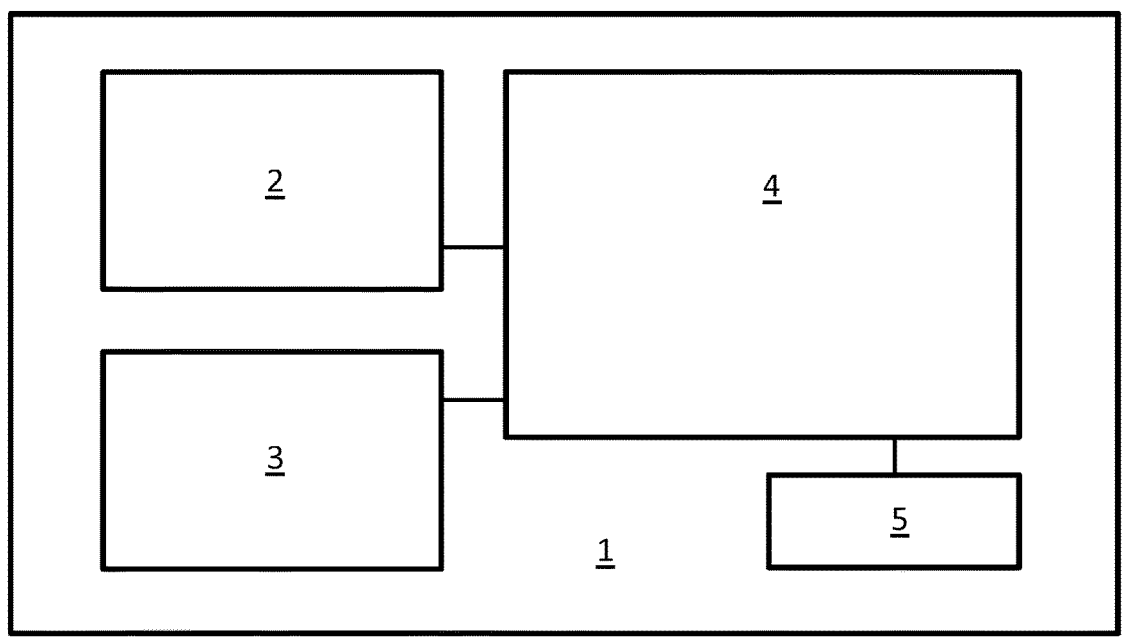
FIG. 6 illustrates schematically an apparatus in a MsgRF.

FIG. 6 illustrates schematically an apparatus 1 configured to provide a MsgRF according to an embodiment. The apparatus 1 comprises a receiver 2, a transmitter 3, a processor 4 and a memory 5. The receiver 2 may be configured to receive messages (e.g. SIP messages and MSRP messages). The transmitter 3 may be configured to send messages (e.g. SIP INFO messages, SIP INVITE responses and MSRP messages). The processor 4 may process any received message according to instructions in the message and/or instructions stored in the memory 5 (e.g. computer readable storage medium). The instructions in any such message may be received with the receiver from an AS, and may comprise a control protocol for controlling the MsgRF. The processor 4 may be configured to process instructions comprising such a control protocol, and to generate one or more new messages according to the instructions. The one or more new messages may be sent from the MsgRF by the transmitter 3. Alternatively, the receiver 2 and transmitter 3 may be parts of a single transceiver. The processor 4 may be a processing unit comprising a plurality of processors.

In order to establish a MSRP session between a UE and the MsgRF, the receiver 2 may receive a SIP INVITE from an AS with a request for establishing a MSRP session with the (specified) UE. The processor 4 processes the SIP INVITE (e.g. according to instructions stored in the memory 5) and effects the transmitter 3 to send a SIP response to the UE via the AS, in order to establish the MSRP session.

The node (i.e. the MsgRF) provides a SIP interface which allows IMS ASs to negotiate an MSRP session using SDP, and to interact with the session by receiving events when messages are sent/received and to send messages on the session. The node also allows for control of chat groups via functionality such as adding and removing, or temporarily muting participants (UEs), sending and receiving events for messages and sending messages.

The above described embodiments provide a MsgRF which may allow IMS ASs to build new functionality that includes messaging with less complexity, by taking advantage of the messaging support in the network provided by the MsgRF. This may improve AS development time and hence cost effectiveness.

The invention claimed is:

1. A method performed by a message resource function (MsgRF) of an IP Multimedia Subsystem (IMS), the method comprising:
the MsgRF receiving a second Session Initiation Protocol (SIP) Invite message transmitted by an Application Server (AS) in response to the AS receiving a first SIP Invite message transmitted by a first user equipment (UE), wherein the second SIP invite message comprises a Message Session Relay Protocol (MSRP) session setup request;
in response to the MsgRF receiving the second SIP Invite message transmitted by the AS, the MsgRF transmitting to the first UE via the AS a SIP response message that is responsive to the SIP Invite message, thereby establishing the MSRP session with the first UE;
after transmitting the SIP response message to the first UE via the AS, the MsgRF receiving an MSRP message transmitted by the first UE, the MSRP message comprising a message chunk;
in response to the MsgRF receiving the MSRP message transmitted by the first UE, the MsgRF transmitting to the AS a first SIP INFO message comprising the message chunk that was included in the MSRP message;
after establishing the MSRP with the first UE, the MsgRF receiving a second SIP INFO message transmitted by the AS;
in response to receiving the second SIP INFO message transmitted by the AS, the MsgRF transmitting to the first UE a first MSRP message containing a text message included in the second SIP INFO message transmitted by the AS to the MsgRF, wherein the MsgRF receives the second SIP INFO message prior to transmitting the first SIP INFO message to the AS;
the MsgRF receiving a third SIP INFO message transmitted by the AS; and
in response to receiving the third SIP INFO message transmitted by the AS, the MsgRF transmitting to the first UE a second MSRP message containing a text message included in the third SIP INFO message transmitted by the AS to the MsgRF.

2. The method of claim 1, wherein the third SIP INFO message instructs the MsgRF to forward the to the first UE the text message included in the third SIP INFO message.

3. The method of claim 2, wherein the second or third SIP INFO message further instructs the MsgRF to retrieve further content and forward to the first UE not only the content included in the second or third SIP INFRO message but also the retrieved further content.

4. An apparatus, the apparatus comprising:
a memory; and
a processor or processors configured to cause the apparatus to perform a process that includes:
receiving a second Session Initiation Protocol (SIP) Invite message transmitted by an Application Server (AS) in response to the AS receiving a first SIP Invite message transmitted by a first user equipment (UE), wherein the second SIP invite message comprises a Message Session Relay Protocol (MSRP) session setup request;
in response to receiving the SIP Invite message transmitted by the AS, transmitting to the first UE via the AS a SIP response message that is responsive to the SIP Invite message, thereby establishing the MSRP session with the first UE;
receiving an MSRP message transmitted by the first UE, the MSRP message comprising a message chunk;
in response to receiving the MSRP message transmitted by the first UE, transmitting to the AS a first SIP INFO message comprising the message chunk that was included in the MSRP message;
after establishing the MSRP with the first UE, receiving a second SIP INFO message transmitted by the AS;
in response to receiving the second SIP INFO message, transmitting to the first UE a first MSRP message containing a text message included in the second SIP INFO message, wherein the apparatus receives the second SIP INFO message prior to transmitting the first SIP INFO message to the AS;
receiving a third SIP INFO message transmitted by the AS; and
in response to receiving the third SIP INFO message transmitted by the AS, transmitting to the first UE a second MSRP message containing a text message included in the third SIP INFO message.

5. The apparatus of claim 4, wherein the apparatus is further configured such that, after establishing the MSRP session with the first UE and after receiving content transmitted by the AS, the apparatus transmits to the first UE an MSRP message containing the content transmitted by the AS.

6. The apparatus of claim 5, wherein receiving the content transmitted by the AS comprises receiving a SIP message transmitted by the AS, wherein the SIP message comprises the content.

7. The apparatus of claim 6, wherein the SIP message instructs the apparatus to forward the content to the first UE.

8. The apparatus of claim 7, wherein the SIP message further instructs the apparatus to retrieve further content and forward to the first UE not only the content included in the SIP message but also the retrieved further content.

* * * * *